(12) United States Patent
Kojima et al.

(10) Patent No.: US 7,323,801 B2
(45) Date of Patent: Jan. 29, 2008

(54) AXIAL AIR-GAP ELECTRONIC MOTOR

(75) Inventors: Tomonori Kojima, Kawasaki (JP);
Toshiaki Tanno, Kawasaki (JP);
Hidetaka Terakubo, Kawasaki (JP);
Takayuki Shinohara, Kawasaki (JP)

(73) Assignee: Fujitsu General Limited,
Kawasaki-Shi, Kanagawa-Ken (JP)

( * ) Notice: Subject to any disclaimer, the term of this patent is extended or adjusted under 35 U.S.C. 154(b) by 71 days.

(21) Appl. No.: 11/208,537

(22) Filed: Aug. 23, 2005

(65) Prior Publication Data
US 2006/0043821 A1     Mar. 2, 2006

(30) Foreign Application Priority Data
Aug. 25, 2004    (JP)    ............................. 2004-244572

(51) Int. Cl.
*H02K 1/22*    (2006.01)

(52) U.S. Cl. .................... 310/268; 310/261; 310/43
(58) Field of Classification Search ................ 310/268, 310/43, 216–217, 194
See application file for complete search history.

(56) References Cited

U.S. PATENT DOCUMENTS

| | | | |
|---|---|---|---|
| 7,173,357 B2 * | 2/2007 | Naito et al. ............ | 310/154.05 |
| 2004/0124733 A1 * | 7/2004 | Yamamoto et al. ......... | 310/218 |

* cited by examiner

*Primary Examiner*—Thanh Lam
(74) *Attorney, Agent, or Firm*—Manabu Kanesaka

(57) ABSTRACT

There is provided an axial air-gap electronic motor in which work for assembling a stator can be performed efficiently. A locking protrusion 26 is provided on a flange portion 24 of core members 21a to 21i which are divided for each teeth 21 and are arranged in a ring form with the rotating shaft axis line being the center, and a connecting member 8 is fitted on the locking protrusion 26, by which the core members 21a to 21i are connected to each other in a ring form.

6 Claims, 6 Drawing Sheets

AXIAL AIR-GAP ELECTRONIC MOTOR

TECHNICAL FIELD

The present invention relates to an axial air-gap electronic motor in which a stator and a rotor are arranged oppositely with a predetermined gap along the axis line direction of a rotating shaft of the rotor. More particularly, it relates to an axial air-gap electronic motor having high assembling workability.

BACKGROUND ART

An axial air-gap electronic motor is an electronic motor in which a rotor is arranged oppositely on one side surface or on both side surfaces of a stator with a predetermined gap, and a feature thereof is that the thickness thereof in the axial direction of the rotating shaft can be decreased, namely, the electronic motor can be made flat as compared with a radial gap electronic motor of an inner rotor type etc.

As described, for example, in Japanese Patent Application Publication No. 2000-253635, in the axial air-gap electronic motor, usually, a plurality of small stators in which a coil is wound on a stator iron core are manufactured in advance, and the small stators are fixed on the inner peripheral surface of a disc-shaped bracket made of a non-magnetic material at equal intervals, by which a disc-shaped stator is obtained.

According to this axial air-gap electronic motor, although the stator can be assembled with ease merely by attaching the small stators to the bracket, a useless space is produced between the small stators, so that a magnetic flux cannot be utilized effectively. As a result, there is no denying that cogging torque also increases.

Also, because of the construction in which small stators are attached to the disc-shaped bracket, wire connecting work between the small stators is troublesome.

SUMMARY OF THE INVENTION

The present invention has been made to solve the above problems, and accordingly an object thereof is to provide an axial air-gap electronic motor in which work for assembling a stator can be performed efficiently.

To achieve the above object, the present invention has some features described below. First, in an axial air-gap electronic motor in which a stator and a rotor are arranged oppositely with a predetermined gap along the rotating shaft axis line direction of the rotor, the stator includes a plurality of core members which are divided for each teeth surface and are arranged in a ring form with the rotating shaft axis line being the center, and the core members are at least connected to each other by a connecting member for connecting the adjacent core members.

According to this configuration, since the stator is configured so that the core members are arranged in a ring form and the shape thereof is held by the connecting member, not only the assembling workability is high, but also the wire connecting workability is very high.

As a more favorable mode, each of the core members includes a neck portion which a coil is wound and a pair of flange portions which are formed on both end sides of the neck portion and each have a teeth surface facing to the rotor, and a locking portion to which the connecting member is locked is provided on the flange portion.

According to this configuration, since the locking portion is provided in a part of the flange portion, the core members can be arranged and temporarily fixed by the connecting member easily without the need for complicated work.

Also, the core member includes a stator iron core having the teeth surface and an insulator formed so as to cover the stator iron core with the teeth surface being left, and the locking portion is provided on the insulator.

According to this configuration, since the locking portion is constructed in a part of the insulator, the locking portion can be formed in advance when the insulator is molded, so that the electronic motor can be produced at a lower cost.

The present invention also embraces the following invention: in an axial air-gap electronic motor in which a stator and a rotor are arranged oppositely with a predetermined gap along the rotating shaft axis line direction of the rotor, the stator includes a plurality of core members which are divided for each teeth surface and are arranged in a ring form with the rotating shaft axis line being the center, and each of the core members is provided with a positioning means with respect to a mold, which is used when the core members are integrated by a synthetic resin.

The stator of a type in which the core members are connected to each other to form one stator (what is called a divided core type stator) is formed by integrally stiffening a portion around the core members with a synthetic resin by injection molding. Therefore, by providing the positioning means, the core members are positioned in the injection mold, and at the same time, the core members can be arranged in a ring form.

Also, each of the core members includes a neck portion on which a coil is wound and a pair of flange portions which are formed on both end sides of the neck portion and each have a teeth surface facing to the rotor, and the positioning means is provided on the flange portion.

As a more favorable mode, the positioning means is configured so that a convex portion or a concave portion fitting to a concave portion or a convex portion provided on the mold side is provided in a part of the flange portion.

According to this configuration, by providing the positioning means in the flange portion of core member, positioning can be performed with great ease merely by putting the core member in the mold. Also, as the positioning means, positioning can be performed with great ease merely by providing the convex portion (or the concave portion) in the flange portion of core member and by forming the concave portion (or the convex portion), which coincides with the convex portion (or the concave portion) in the flange portion, in the mold.

As another mode, the core member includes a stator iron core having the teeth surface and an insulator formed so as to cover the stator iron core with the teeth surface being left, and the positioning means consists of a height difference surface formed between the teeth surface of the stator iron core and the flange portion of the insulator.

According to this configuration, the height difference is provided between the insulator and the teeth surface, and the core member is positioned in the mold by utilizing the height difference, by which the core member can be positioned by an easier method.

DETAILED DESCRIPTION

Figure 1:
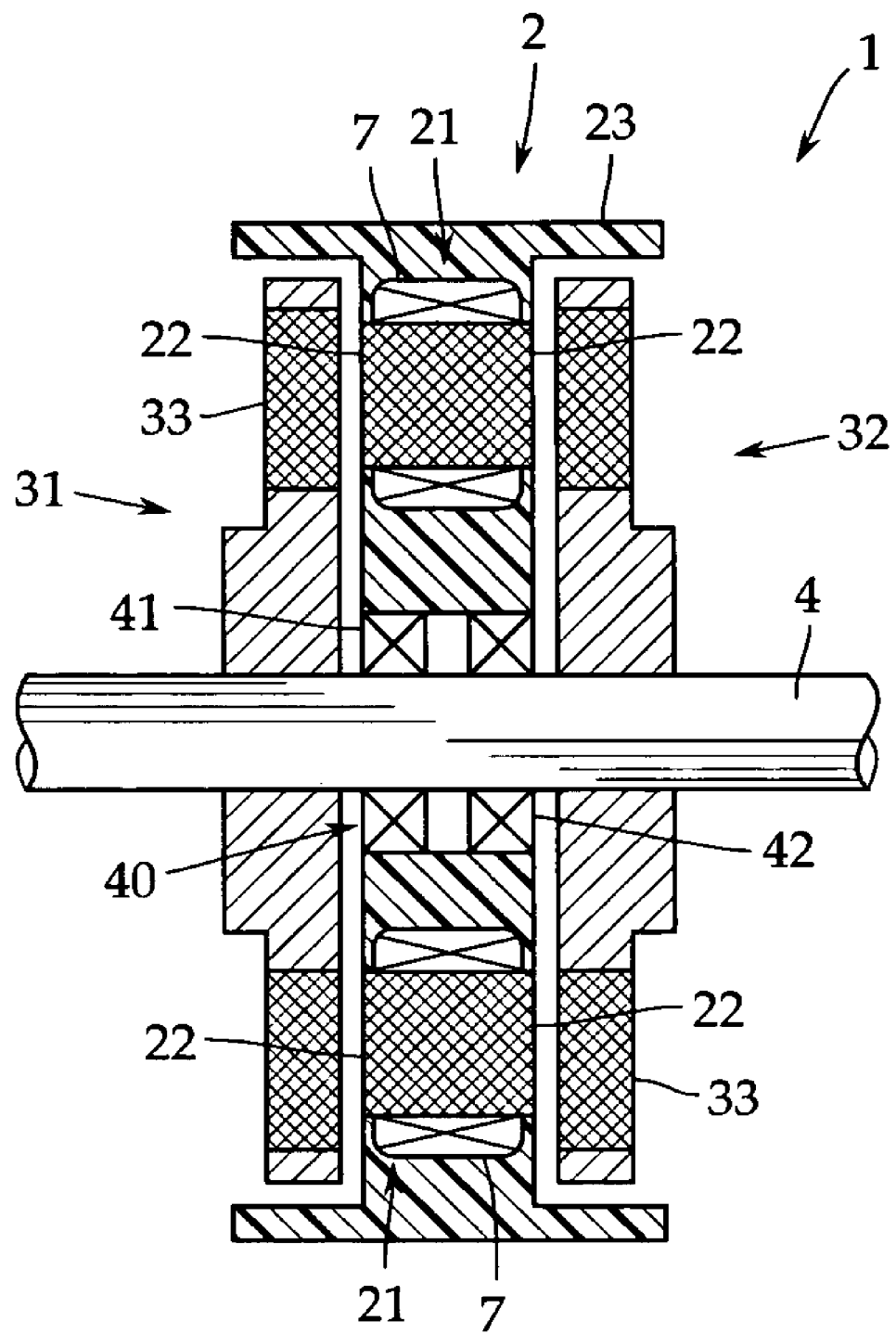
FIG. 1 is a sectional view of an essential portion of an axial air-gap electronic motor in accordance with one embodiment of the present invention.
Figure 2:
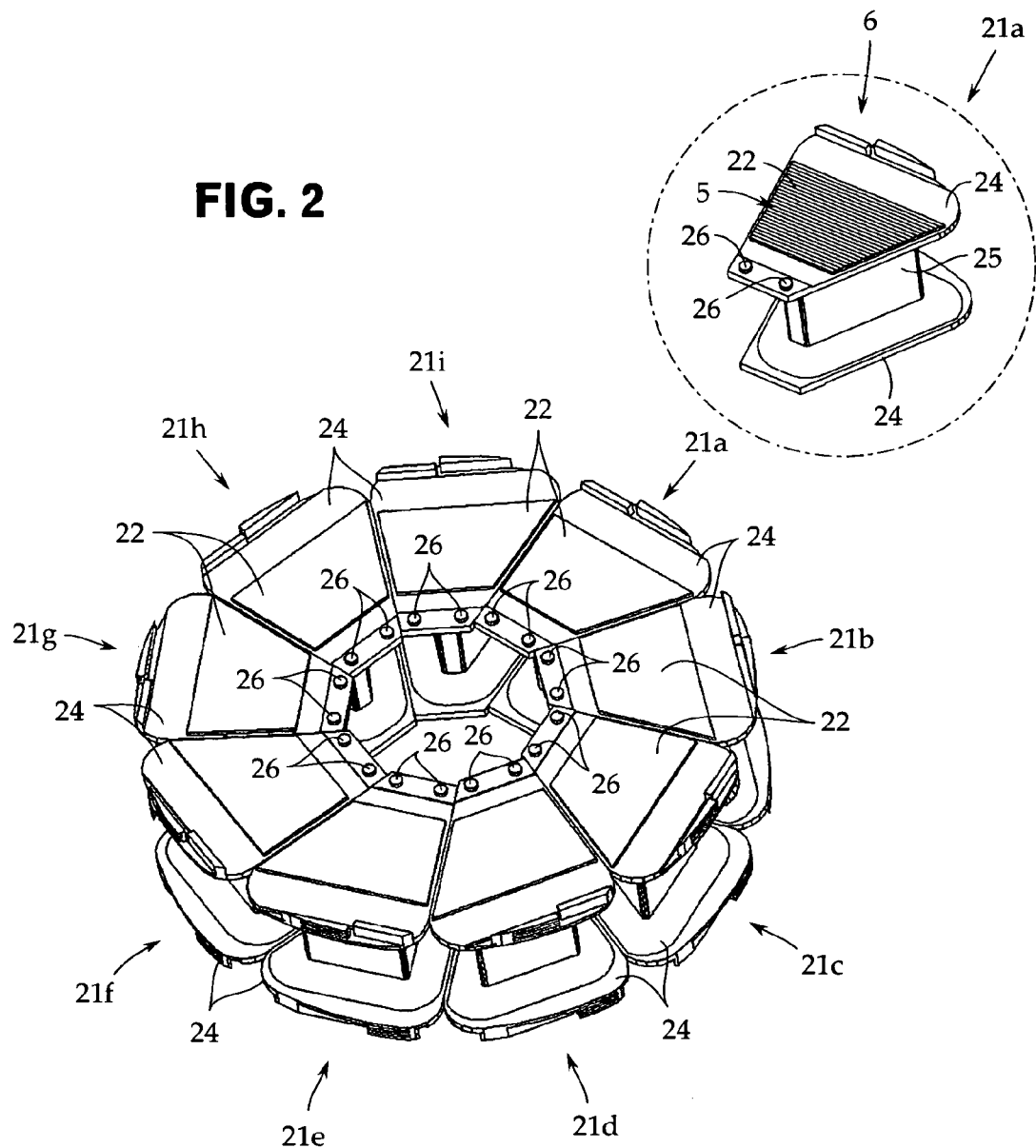
FIG. 2 is a perspective view of a core member of a stator for the axial air-gap electronic motor.

Embodiments of the present invention will now be described with reference to the accompanying drawings. FIG. 1 is a sectional view schematically showing an internal construction of an axial air-gap electronic motor in accordance with one embodiment of the present invention, and FIG. 2 is a perspective view showing a state in which core members are arranged in a ring form. The present invention is not limited to the embodiment shown in these figures.

This axial air-gap electronic motor 1 includes a stator 2 formed in a disc shape and a pair of rotors 31 and 32 disposed oppositely on both side surfaces of the stator 2 with a predetermined gap provided between the stator and the rotor. The rotors 31 and 32 are fixed coaxially on a rotor output shaft 4 for delivering a rotational driving force.

In this example, the axial air-gap electronic motor 1 is a permanent magnet electronic motor of a two rotor type having the rotors 31 and 32 on both side surfaces of the stator 2. However, the axial air-gap electronic motor 1 may be of a one rotor type in which the rotor is disposed on one side only of the stator 2.

The stator 2 and the rotors 31 and 32 are contained in a bracket, not shown, made of a non-magnetic material, and the outer edge of the stator 2 is fixed on the inner peripheral surface of the bracket. In the rotors 31, 32, rotor magnets 33 consisting of a permanent magnet are arranged in a ring form.

The stator 2 includes a plurality of core members 21a to 21i each having teeth surfaces 22 facing to the rotor magnets 33 of the rotors 31 and 32. The core members 21a to 21i are arranged in a ring form on a concentric circle with the axis of rotation of the rotor output shaft 4 being the center.

As shown in FIG. 1, each of the core members 21 is integrally molded by a synthetic resin material 23 in a state in which the core members 21 are arranged in a ring form. FIG. 2 shows a state in which nine core members 21a to 21i are arranged in a ring form.

Referring again to FIG. 1, a bearing portion 40 is arranged in a central part of the stator 2. In this example, the bearing portion 40 has a pair of radial ball bearings 41 and 42. The inner race of the radial ball bearing 41, 42 is press fitted on the rotor output shaft 4, and the outer race side thereof is embedded in the synthetic resin material 23. In the present invention, the bearing portion 40 may have any configuration.

Although the rotors 31 and 32 have the same rotor rotating shaft 4 in common in this example, a two output shaft type, in which each of the rotors 31 and 32 has an individual rotor rotating shaft, may be used. Furthermore, a shaft-less type, in which the rotors 31 and 32 do not have the rotor output shaft 4, and are supported directly on the stator 2 via radial ball bearings, may be used.

Next, a specific construction of the stator 2 is explained. As shown in FIG. 2, the stator 2 includes nine core members 21a to 21i arranged in a ring form with the axis line of rotation being the center axis. Since the core members 21a to 21i each have the same construction, in this example, explanation is given by taking the core member 21a (enlargedly shown in FIG. 2) as an example.

The core member 21a consists of a combination of a stator iron core 5, which is formed by laminating electromagnetic steel sheets formed in an H shape along the radial direction, and an insulator 6, which is formed so as to cover the outer periphery of the stator iron core 5 with the teeth surfaces 22 being left. The insulator 6 is composed of a molded product of insulating resin.

This core member 21a is formed in a bobbin shape including a pair of flange portions 24, 24 each including the teeth surface 22 and a neck portion 25 for connecting the flange portions 24, 24 to each other, and a coil 7 (refer to FIG. 1) is wound on the neck portion 25.

On the side surface (the teeth surface 22 side) on the inside diameter side of each of the flanges 24, 24, a pair of locking protrusions 26, 26 are provided. The locking protrusions 26, 26 are a fixing means on one side, which is used to temporarily fix the core members 21a to 21i to each other in a ring form, and in this example, they are bosses molded integrally with the insulator 6.

Although the locking protrusions 26, 26 are provided on both of the flange portions 24, 24 in this example, they have only to be provided either one of the flange portions 24, 24.

Figure 3A:
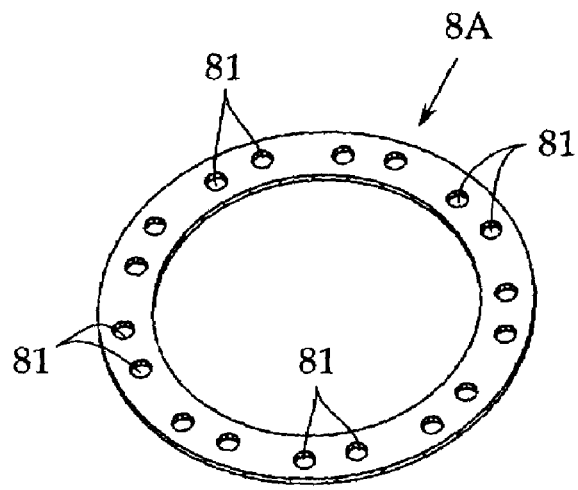
FIG. 3A is a perspective view of a connecting member for fixing core members.
Figure 3B:
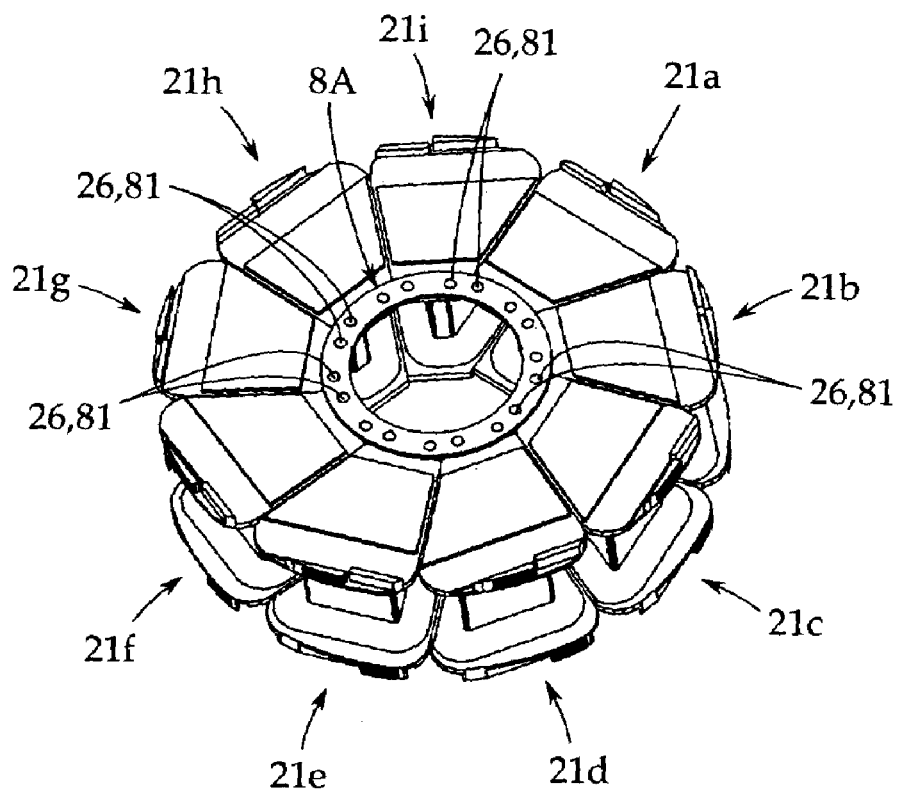
FIG. 3B is a perspective view showing a state in which the connecting member shown in FIG. 3A is used.

By installing a connecting member serving as a fixing means on the other side on the locking protrusions 26, 26, the core members 21a to 21i are connected in a ring form. As shown in FIGS. 3A and 3B, a connecting member 8A is made of a synthetic resin, and is formed in a disc ring shape. The connecting member 8A is formed with locking holes 81 that are fitted on the locking protrusions 26.

In this example, although the connecting member 8A is made of a general synthetic resin, the same synthetic resin material as the synthetic resin 23 for molding the stator 2 is preferably used because of its high affinity for mold resin. Besides, the connecting member 8A may be made of a metal.

Although the connecting member 8A is formed in a ring form in this example, the shape thereof is not limited to a ring shape. If at least core members adjacent to right and left can be fixed, the core members 21a to 21i can be temporarily fixed in a ring form.

Figure 4A:
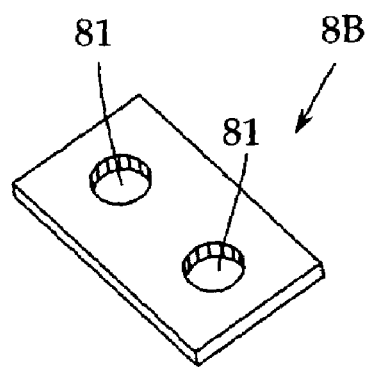
FIG. 4A is a perspective view of another connecting member for fixing core members.
Figure 4B:
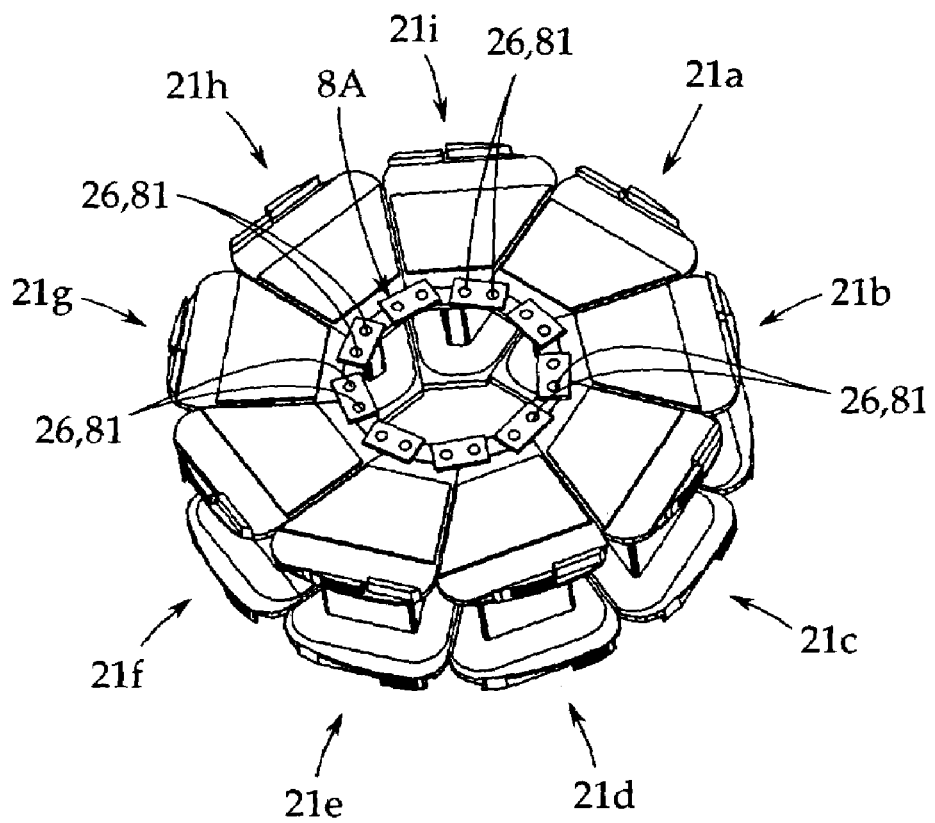
FIG. 4B is a perspective view showing a state in which the connecting member shown in FIG. 4A is used.

Therefore, as shown in FIGS. 4A and 4B, a connecting member 8B is formed by a rectangular plate, and is provided with two locking holes 81, 81 that can connect the locking protrusions 26, 26 of the adjacent core members to each other.

According to this configuration, by installing the connecting member 8B on the locking protrusions 26 of two core members 21b and 21i adjacent to the core member 21a, the core members 21a to 21i can be fixed to each other in a ring form. Such a mode is also embraced in the present invention.

In the above-described embodiment, the fixing means consists of the locking protrusions 26 formed on the flange portion 24 and the locking holes formed in the connecting member 8A, 8B. However, it is a matter of course that the locking holes may be provided on the flange portion 24 side, and inversely the locking protrusions may be provided on the connecting member side.

Also, although two locking protrusions 26 are provided on one of the core members 21a to 21i in this example, at least one locking protrusion 26 has only to be provided in the case where a ring-shaped connecting member 8A as shown in FIG. 3A is used.

Further, although the locking protrusions 26 are provided on the inside diameter side of the flange portion 24 in this example, the locking protrusions 26 may be provided on the outside diameter side. In this case, the outside diameter of the connecting member 8A, 8B is also required to be increased.

In the example described above, the core members 21a to 21i are temporarily fixed to each other by using the connecting members 8A, 8B. The core members 21a to 21i are put into a special-purpose mold after being arranged in a ring form, and the synthetic resin 23 is poured into the mold, by which the core members 21a to 21i are molded integrally, and thereby the stator 2 is formed.

A second embodiment of the present invention is characterized in that each of the core members 21a to 21i is provided with a positioning means with respect to the mold, and by utilizing this positioning means, the core members 21a to 21i are arranged in a ring form and also integrated. Hereunder, one example is explained with reference to FIGS. 5 to 8.

In this example as well, since the core members 21a to 21i each have the same construction, explanation is given by taking one core member 21a as an example. The same reference numerals are applied to elements that are the same or regarded as the same as the elements in the above-described embodiment, and explanation of the elements is omitted.

Figure 5A:
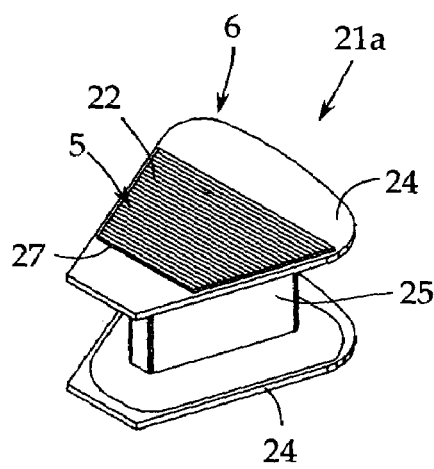
FIG. 5A is a perspective view for illustrating a means for positioning a core member.
Figure 5B:
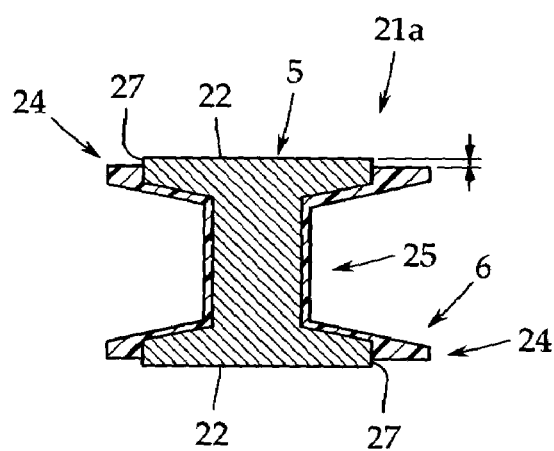
FIG. 5B is a sectional view of the core member shown in FIG. 5A.

As shown in FIG. 5, the core member 21a has the stator iron core 5 formed by the electromagnetic steel sheets and the insulator 6 formed around the stator iron core 5, and by combining these elements, the core member 21a is formed in a bobbin shape having the paired flange portions 24, 24 and the neck portion 25 connecting the flange portions 24, 24 to each other.

In this example, for the flange portion 24, the teeth surface 22 of the stator iron core 5 is formed so as to be one step higher in the rotating shaft direction than the insulator 6, and a height difference surface 27 is formed between the insulator 6 and the teeth surface 22.

Figure 7A:
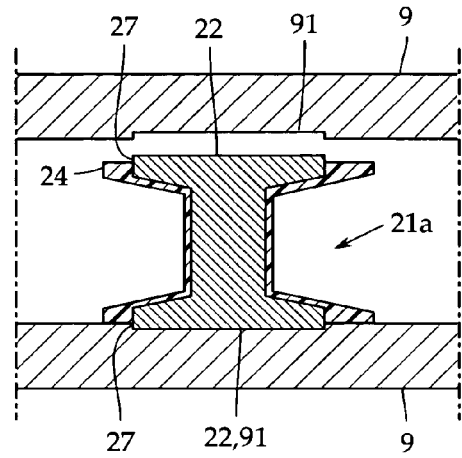
FIG. 7A is an explanatory view for illustrating a means for positioning the core member shown in FIG. 5 with respect to a mold.
Figure 7B:
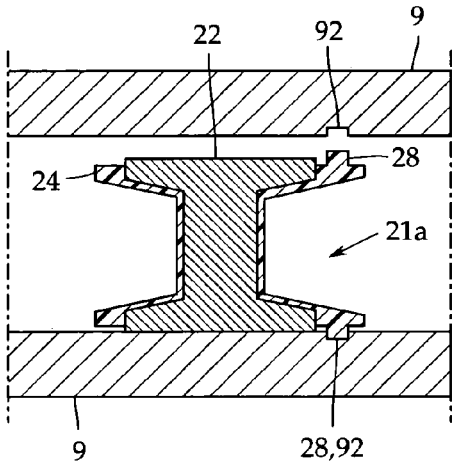
FIG. 7B is an explanatory view for illustrating a means for positioning the core member shown in FIG. 6 with respect to a mold.
Figure 8:
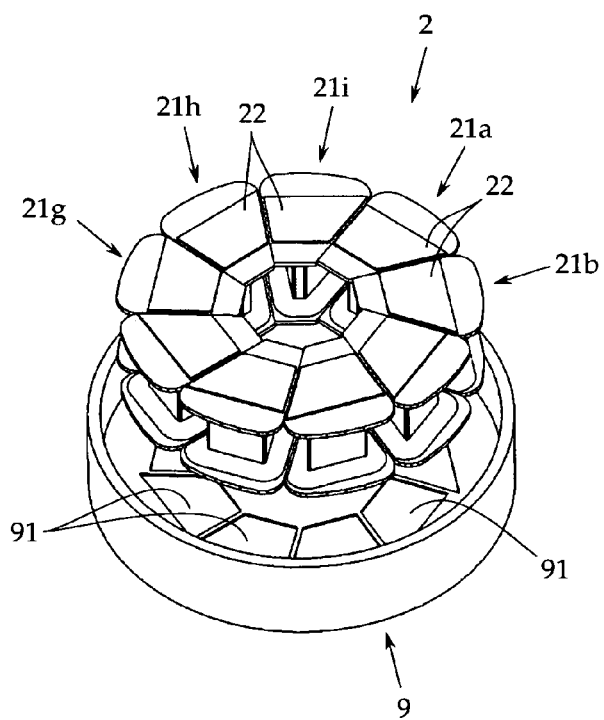
FIG. 8 is a perspective view showing a state in which a core member is put in a mold.

According to this configuration, since the teeth surface 22 projects in the axial direction from the flange portion 24 by a height of the height difference surface 27, the teeth surface 22 is convex. Therefore, as shown in FIG. 7A, a concave portion 91 coinciding with the teeth surface 22 is provided in a mating surface of a mold 9. Thereby, not only the core members 21a to 21i can be positioned in a ring form with great ease merely by setting the core members 21a to 21i along the concave portion 91 as shown in FIG. 8, but also the temporarily fixing means need not be provided on the core members 21a to 21i.

Figure 6A:
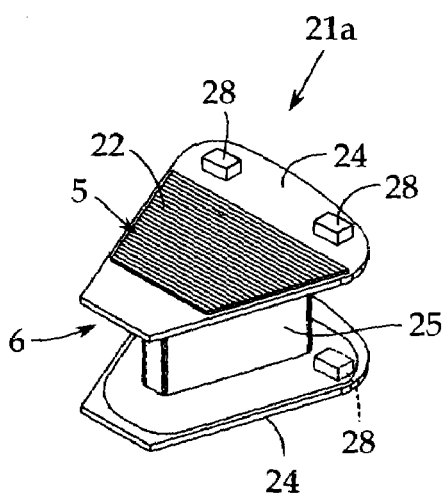
FIG. 6A is a perspective view for illustrating another means for positioning a core member.
Figure 6B:
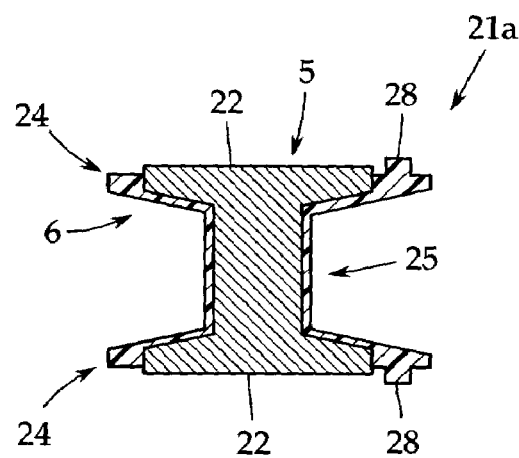
FIG. 6B is a sectional view of the core member shown in FIG. 6A.

In the above-described example, the height difference portion 27 is provided, and the teeth surface 22 is formed so as to be one step higher than the flange portion 24, by which the positioning means is formed by utilizing the height difference. Besides, as shown in FIGS. 6A and 6B, a convex portion 28 may be provided in a part of the insulator 6 constituting the flange portion 24, and a concave portion 92 (refer to FIG. 7B) may be provided in the mold 9 on the other side.

By this configuration as well, the core members 21a to 21i can be positioned in a ring form, and since this configuration is also simple, the configuration can be carried out at a low cost.

Also, the above-described locking protrusions 26 shown in FIG. 2 may be used as a positioning means. In this case, by providing concave portions corresponding to the locking holes 81 of the connecting member 8A on the mold 9 side, the core members 21a to 21i can be positioned in the mold 9.

The present application is based on, and claims priority from, Japanese Application Serial Number JP2004-244572, filed Aug. 25, 2004, the disclosure of which is hereby incorporated by reference herein in its entirety.

The invention claimed is:

1. An axial air-gap electronic motor comprising a stator and a rotor arranged oppositely with a predetermined gap along a direction of a rotating shaft axis line of the rotor, wherein the stator includes a plurality of core members which are divided separately to be arranged in a ring form with the rotating shaft axis line as a center so that the plurality of core members is integrally molded together in a mold by a synthetic resin, and each of the core members formed separately is provided with positioning means with respect to the mold for positioning each of the plurality of core members separately in the ring form in the mold.

2. The axial air-gap electronic motor according to claim 1, wherein each of the core members includes a neck portion, a coil wound around the neck portion, and a pair of flange portions which are formed on both end sides of the neck portion and each have a teeth surface facing the rotor, and the positioning means is provided on the flange portion.

3. The axial air-gap electronic motor according to claim 2, wherein the positioning means is a convex portion or a concave portion provided in a part of the flange portion and fitting to a concave portion or a convex portion provided on the mold side.

4. The axial air-gap electronic motor according to claim 1, wherein the core member includes a stator iron core having a teeth surface and an insulator formed so as to cover the stator iron core with the teeth surface being left, and the positioning means is a height difference surface formed between the teeth surface of the stator iron core and the flange portion of the insulator.

5. The axial air-gap electronic motor according to claim 2, wherein said positioning means is a projection projecting outwardly from an outer surface of the flange portion of each of the core member.

6. The axial air-gap electronic motor according to claim 5, wherein the core member includes a stator iron core having a teeth surface and an insulator formed so as to cover the stator iron core with the teeth surface being left, and the projection projecting from the insulator.

* * * * *